(12) United States Patent
Murakami

(10) Patent No.: US 9,764,793 B2
(45) Date of Patent: Sep. 19, 2017

(54) FRONT FORK

(71) Applicant: Showa Corporation, Gyoda-shi (JP)

(72) Inventor: Yosuke Murakami, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 30 days.

(21) Appl. No.: 15/052,048

(22) Filed: Feb. 24, 2016

(65) Prior Publication Data

US 2016/0288867 A1   Oct. 6, 2016

(30) Foreign Application Priority Data

Mar. 31, 2015   (JP) ................................ 2015-074209

(51) Int. Cl.
*F16F 9/32* (2006.01)
*B62K 25/08* (2006.01)

(52) U.S. Cl.
CPC ............ *B62K 25/08* (2013.01); *F16F 9/3292* (2013.01)

(58) Field of Classification Search
CPC ...... B60G 17/08; B60G 17/016; B62K 25/04; B62K 25/08; F16F 9/464
USPC ..................... 188/267.1, 267.2; 280/275, 276
See application file for complete search history.

(56) References Cited

U.S. PATENT DOCUMENTS

| | | | | |
|---|---|---|---|---|
| 4,879,440 | A * | 11/1989 | Lymburner ............. | H01H 3/16 200/47 |
| 7,234,386 | B2 * | 6/2007 | Schedgick ............ | B60G 13/14 92/113 |
| 7,878,311 | B2 * | 2/2011 | Van Weelden .......... | F16F 9/465 137/487.5 |
| 8,905,409 | B2 * | 12/2014 | Murakami ......... | B60G 17/0152 280/276 |
| 2009/0057078 | A1 * | 3/2009 | Ellis ........................ | F16F 9/535 188/267.2 |
| 2011/0005387 | A1 | 1/2011 | Ehre et al. | |
| 2012/0160621 | A1 * | 6/2012 | Battlogg ................ | B60G 17/08 188/267.2 |

(Continued)

FOREIGN PATENT DOCUMENTS

| | | |
|---|---|---|
| DE | 102006006286 A | 8/2006 |
| EP | 1878648 A | 1/2008 |

(Continued)

OTHER PUBLICATIONS

Extended European Search Report mailed Aug. 17, 2016 for the corresponding European Patent Application No. 16157283.9.

*Primary Examiner* — Christopher Schwartz
(74) *Attorney, Agent, or Firm* — Leason Ellis LLP

(57) ABSTRACT

A front fork has a damping variable leg including: an outer tube at an upper end side; an inner tube at a lower end side and inserted into the outer tube; a piston rod attached to the outer tube and extending toward the lower end side; a piston at a lower end of the piston rod; and a damping force variable device at the piston so as to generate variable damping force by controlling a flow of an operating fluid. The damping variable leg further includes: a conductor member attached to the piston; and a coil conductor covered with an insulating member and attached to the inner tube. The conductor member is configured to be inserted into the coil conductor. The damping variable leg detects a stroke amount of the damping variable leg based on a change in inductance of the coil conductor.

16 Claims, 8 Drawing Sheets

(56) References Cited

U.S. PATENT DOCUMENTS

2013/0320647 A1* 12/2013 Awasa ................... B62K 21/02
                                                    280/276
2015/0276004 A1* 10/2015 Murakami .............. F16F 9/512
                                                    188/313
2016/0280315 A1*  9/2016 Murakami ............. B62K 21/02

FOREIGN PATENT DOCUMENTS

EP           2796357 A    10/2014
JP         06-263078 A     9/1994
WO    WO-2014/134500 A     9/2014

* cited by examiner

FRONT FORK

CROSS-REFERENCE TO RELATED APPLICATIONS

This application is based on and claims priority under 35 USC 119 from Japanese Patent Application No. 2015-074209 filed on Mar. 31, 2015 the entire content of which is incorporated herein by reference.

BACKGROUND

1. Technical Field

The present invention relates to a front fork.

2. Related Art

In a two-wheeled motor vehicle, a front wheel is attached to a front fork having first and second legs connected to a front portion of a vehicle body, and a rear wheel is attached to a rear suspension having first and second legs connected to a rear portion of the vehicle body. When the two-wheeled motor vehicle travels, a shock resulting from the vertical movement of the front and rear wheels being in contact with the ground surface is transmitted to the vehicle body via the front fork and the rear suspension. In order to improve the riding quality during traveling of the two-wheeled motor vehicle, it is requested to reduce the shock transmitted from the ground surface to the vehicle body.

Some conventional front forks include a mechanism for damping vibration from the ground surface. Moreover, some conventional front forks include a stroke detector for detecting an operating stroke of the front fork during traveling of the two-wheeled motor vehicle. As described above, conventional front forks include a structure (a damping force variable device) for damping vibration or a stroke sensor for detecting a stroke amount of the front fork.

Patent Document 1: Japanese Patent Application Laid-open No. H6-263078

As described above, in the conventional front forks, the structures such as the damping force variable device and the stroke sensor that provide different effects to the front fork are provided to the individual legs. For example, the conventional two-wheeled motor vehicle includes a damping force variable device (or a stroke sensor) provided in a first leg of the front fork and also includes a stroke sensor (or the damping force variable device) provided in a second leg (or the damping force variable device is not provided in the second leg).

However, in general, since the front fork is electronically controlled, calibration of the front fork is performed in a test step during shipment from a factory or maintenance. As in the conventional two-wheel vehicle, when a front fork having the structures of the damping force variable device and the stroke sensor having different effects provided in the individual legs is calibrated, it is necessary to perform different calibrations to the leg having the structure of the damping force variable device and the leg having the structure of the stroke sensor. Thus, there is a problem in that the number of operation steps for calibrations consumed for the front fork increases and the operation time increases.

SUMMARY OF THE INVENTION

An object of the present invention is to provide a front fork in which the structures of a damping force variable device and a stroke sensor providing different effects are provided in a single damping variable leg so that a plurality of structures can be integrated and the front fork can be calibrated easily and quickly.

According to an embodiment of the present invention, there is provided a front fork having a damping variable leg, the damping variable leg including: an outer tube provided at an upper end side of the front fork; an inner tube provided at a lower end side of the front fork and inserted into an inner circumference side of the outer tube; a piston rod, an upper end of which is attached to an upper end of the outer tube, the piston rod extending toward the lower end side along an axial direction of the outer tube; a piston provided at a lower end of the piston rod; and a damping force variable device provided at the piston so as to generate variable damping force by controlling a flow of an operating fluid enclosed in the damping variable leg. The damping variable leg includes: a conductor member, an upper end of which is attached to the piston, the conductor member extending toward the lower end side along the axial direction; and a coil conductor covered with an insulating member, a lower end of the coil conductor being attached to a lower end of the inner tube, the coil conductor extending toward the upper end side along the axial direction, the coil conductor being configured such that the conductor member can be inserted into the coil conductor. The damping variable leg detects a stroke amount of the damping variable leg based on a change in inductance of the coil conductor.

DESCRIPTION OF EMBODIMENTS

Hereinafter, an embodiment of the present invention will be described with reference to the drawings.

[Configuration of Two-Wheeled Motor Vehicle]

Figure 1:
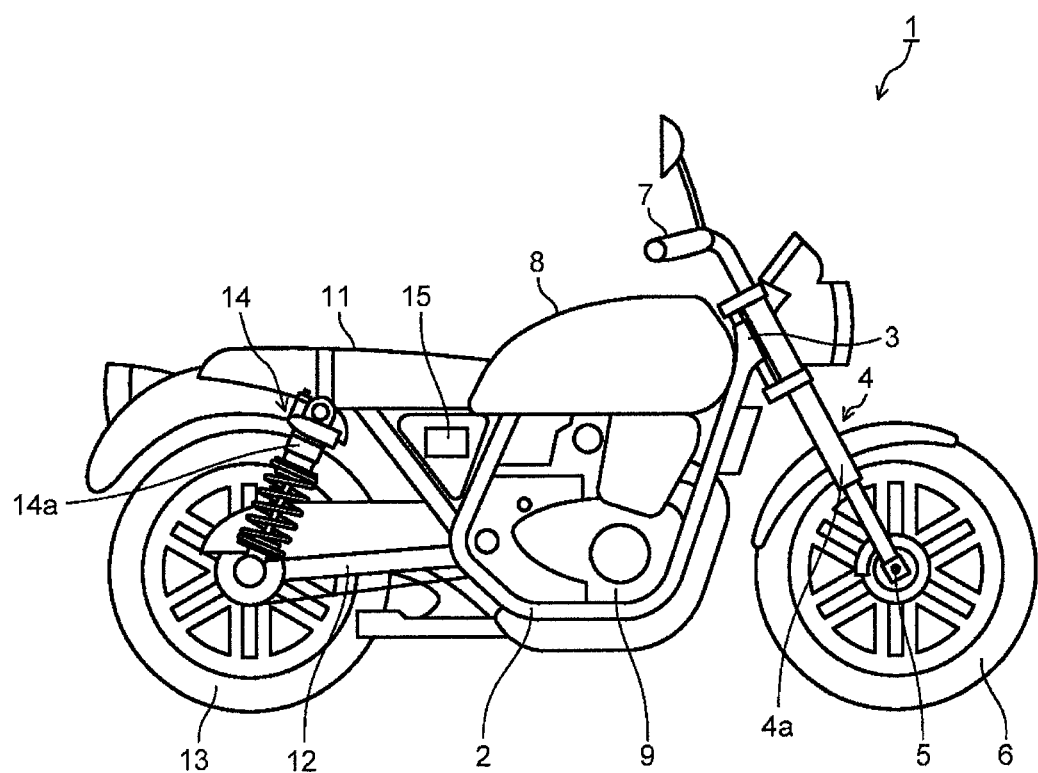
FIG. 1 is a side view illustrating a schematic configuration of a two-wheeled motor vehicle having a front fork according to an embodiment.
Figure 2:
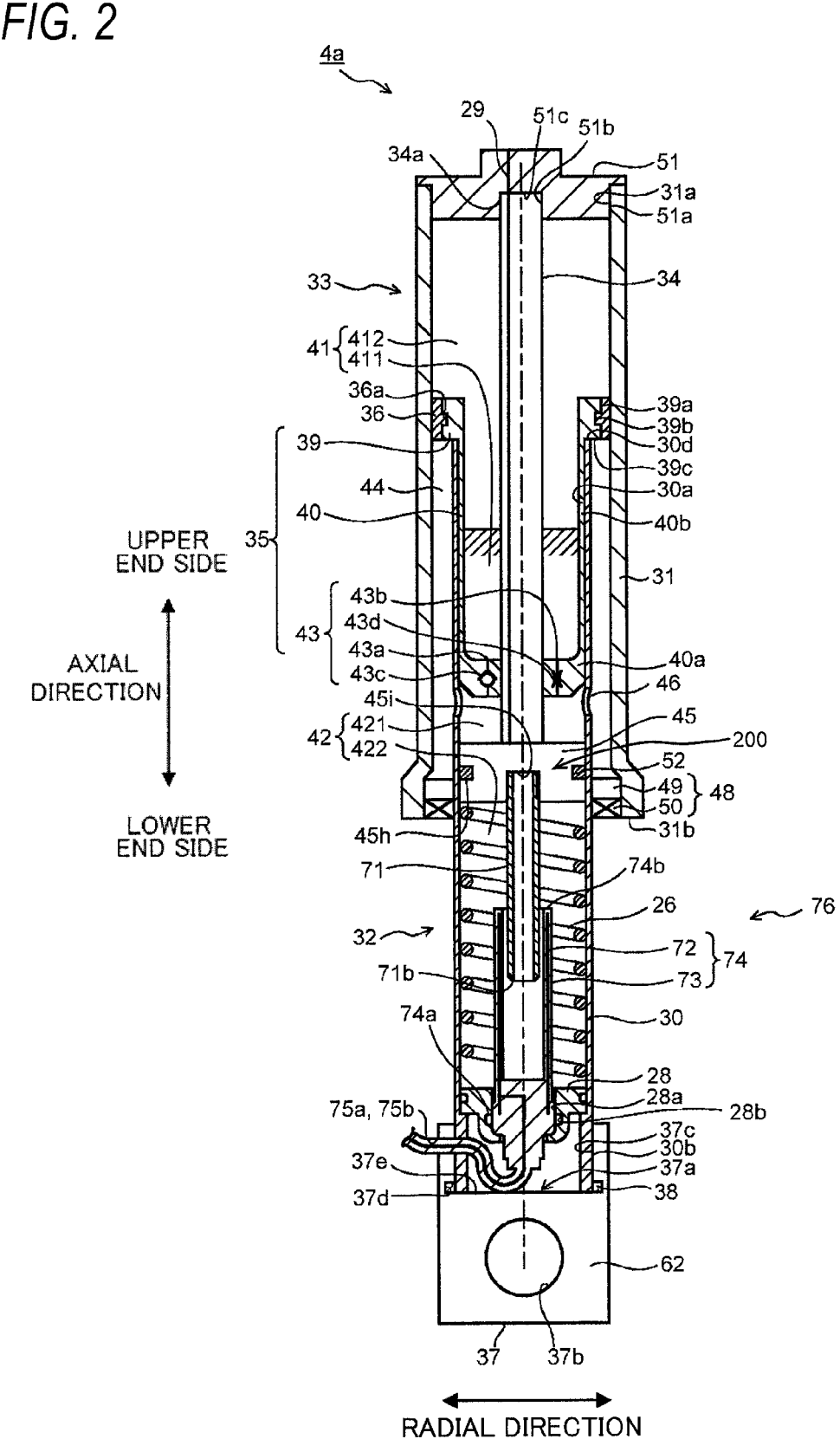
FIG. 2 is a longitudinal sectional view schematically illustrating a schematic configuration of a first leg of the front fork according to the embodiment.
Figure 3:
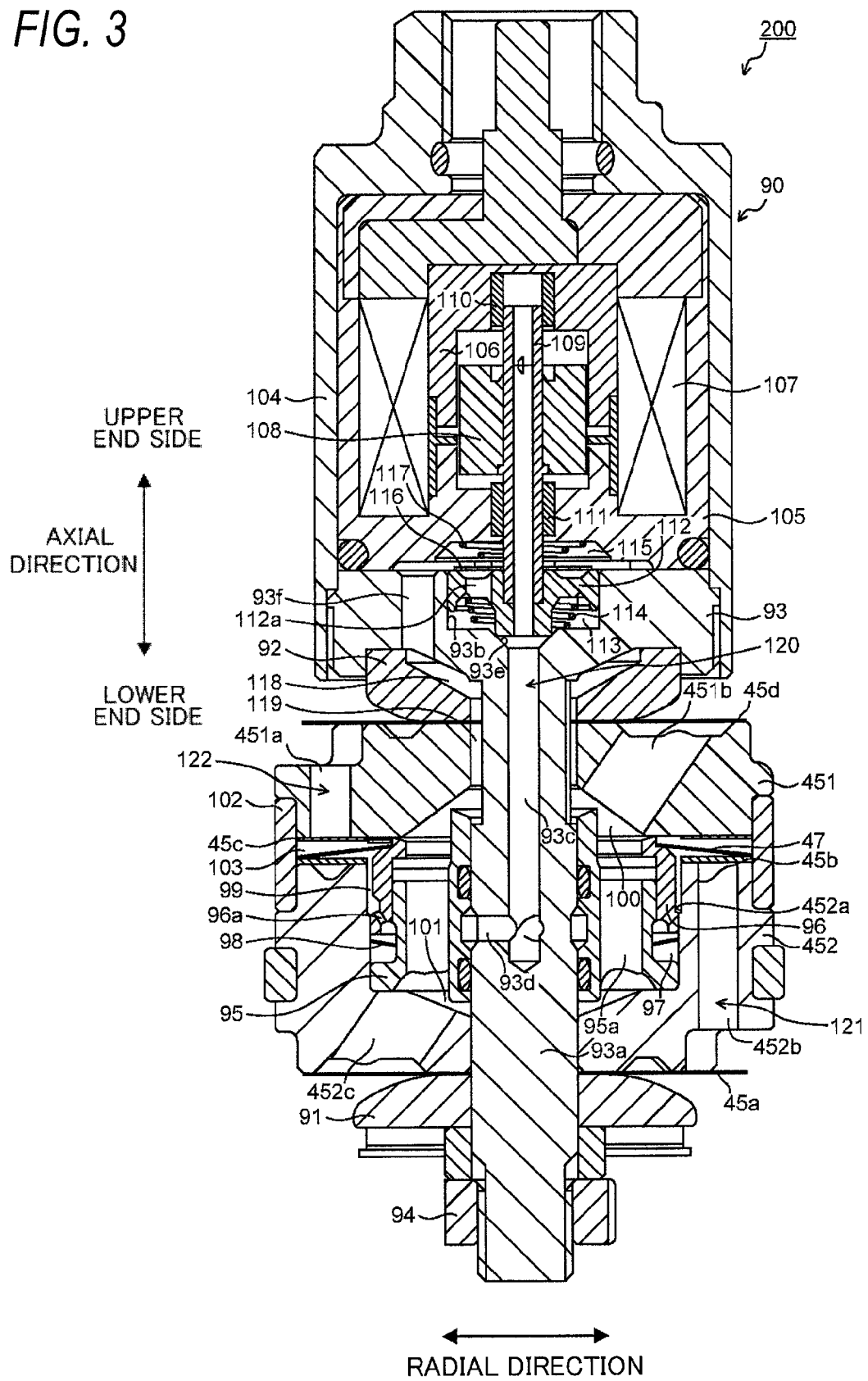
FIG. 3 is a longitudinal sectional view illustrating a damping force variable device provided in the first leg of the front fork according to the embodiment.
Figure 4:
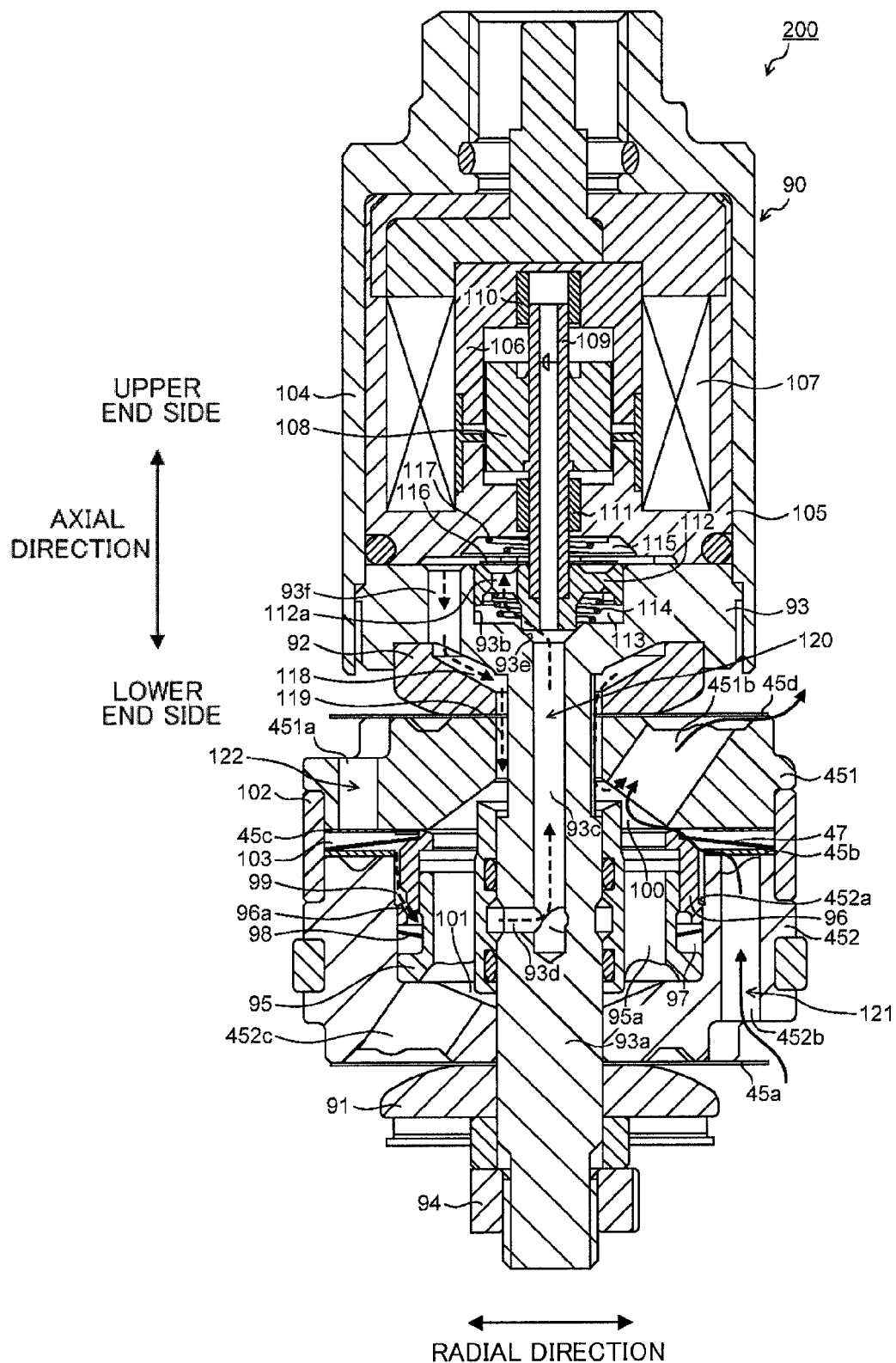
FIG. 4 is a longitudinal sectional view schematically illustrating the flow of an operating fluid during compression-side stroke of the first leg of the front fork according to the embodiment.
Figure 5:
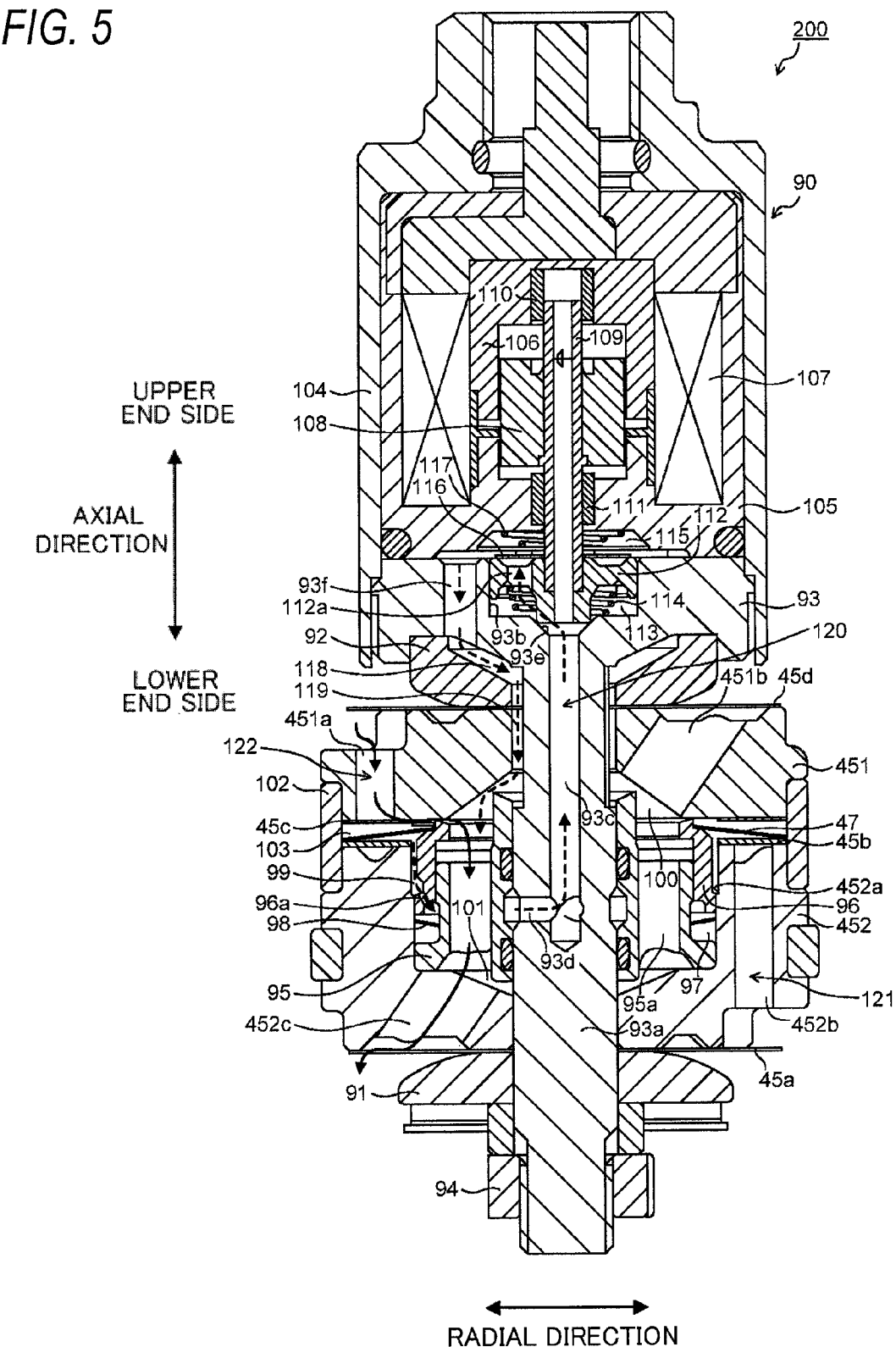
FIG. 5 is a longitudinal sectional view schematically illustrating the flow of an operating fluid during extension-side stroke of the first leg of the front fork according to the embodiment.
Figure 6:
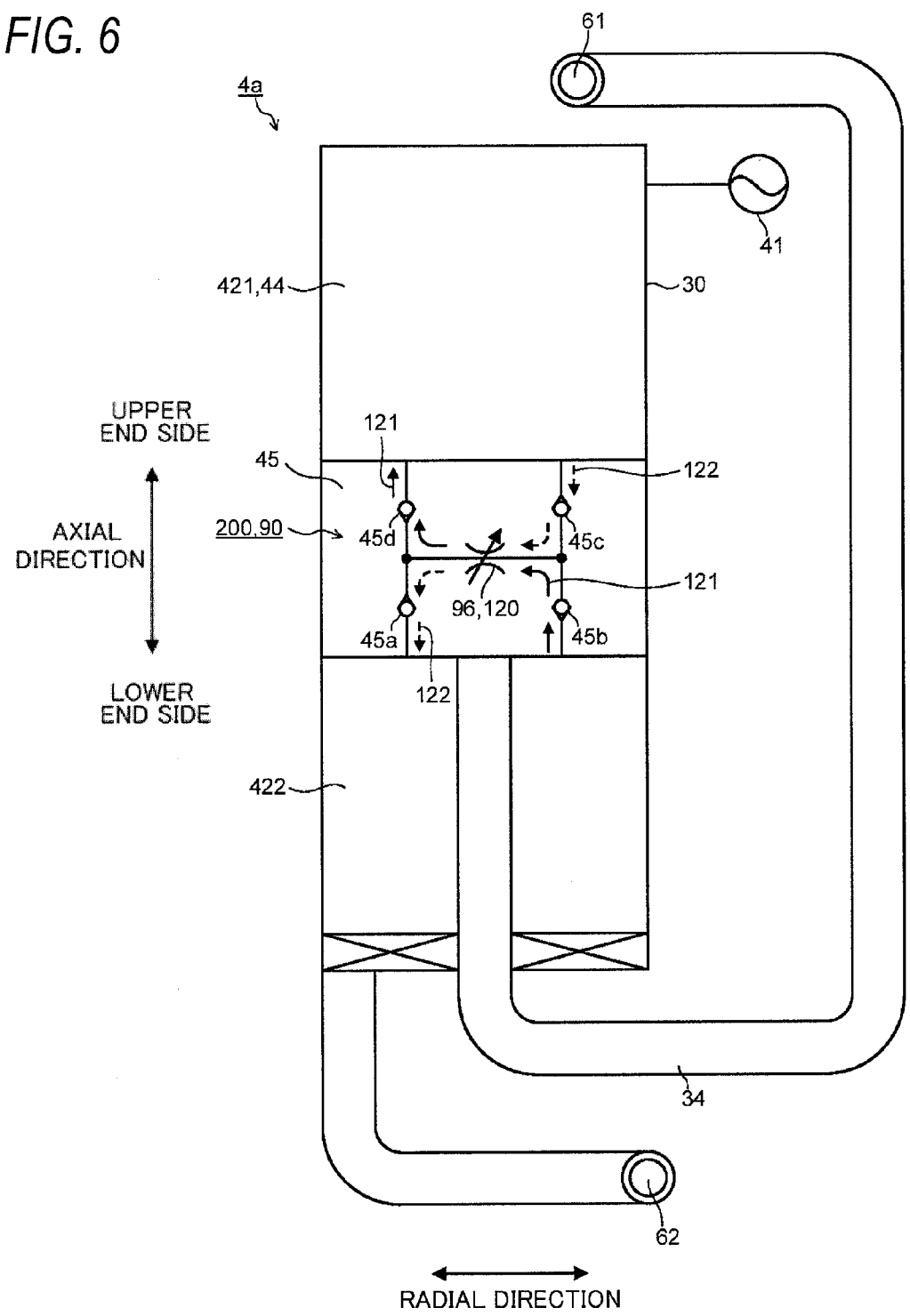
FIG. 6 is a hydraulic circuit diagram of the first leg of the front fork according to the embodiment.

FIG. 1 is a side view illustrating a schematic configuration of a two-wheeled motor vehicle 1 having a front fork 4 according to the embodiment. FIG. 2 is a longitudinal sectional view schematically illustrating a schematic configuration of a first leg 4a of the front fork 4 according to the embodiment. FIG. 3 is a longitudinal sectional view illustrating a damping force variable device 200 provided in the first leg 4a according to the embodiment. FIG. 4 is a longitudinal sectional view schematically illustrating the flow of oil during compression-side stroke of the first leg 4a of the front fork 4. FIG. 5 is a longitudinal sectional view schematically illustrating the flow of oil during extension-side stroke of the first leg 4a of the front fork 4. FIG. 6 is a hydraulic circuit diagram of the first leg 4a of the front fork 4 according to the embodiment.

The two-wheeled motor vehicle 1 illustrated in FIG. 1 includes a vehicle body frame 2 that forms a part of a vehicle body, a head pipe 3 attached to a front end of the vehicle body frame 2, a front fork 4 having a pair of first leg 4a and second leg (not illustrated) provided in the head pipe 3, and a front wheel 6 attached to a lower end of the front fork 4 with an axle 5 interposed. The first leg 4a of the front fork 4 is disposed on the right side of the front wheel 6, and the second leg of the front fork 4 is disposed on the left side of the front wheel 6. In FIG. 1, only the first leg 4a disposed on the right side in the traveling direction is illustrated and the second leg disposed on the left side is not illustrated.

Moreover, the two-wheeled motor vehicle 1 includes a handle 7 attached to an upper portion of the front fork 4, a fuel tank 8 attached to a front upper portion of the vehicle body frame 2, and an engine 9 disposed on a lower side of the fuel tank 8. Further, the two-wheeled motor vehicle 1 includes a seat 11 attached to a rear upper portion of the vehicle body frame 2, a swing arm 12 attached to a lower portion of the vehicle body frame 2 so as to freely swing, a rear wheel 13 attached to a rear end of the swing arm 12, and a rear suspension 14 having a pair of first leg 14a and second leg (not illustrated) attached between the swing arm 12 and the vehicle body frame 2. The first leg 14a of the rear suspension 14 is disposed on the right side of the rear wheel 13 and the second leg of the rear suspension 14 is disposed on the left side of the rear wheel 13. Similarly to the front fork, in FIG. 1, only the first leg 14a disposed on the right side in the traveling direction is illustrated, and the second leg disposed on the left side is not illustrated. Further, the two-wheeled motor vehicle 1 includes a controller 15 that controls the entire two-wheeled motor vehicle 1.

The vehicle body frame 2 is a frame that supports functional members that form the vehicle body, such as the fuel tank 8 and the engine 9, for example. The head pipe 3 is an approximately cylindrical member. A handle rotation shaft (not illustrated) provided integrally with the handle 7 and the front fork 4 is inserted in the head pipe 3, and the head pipe 3 rotatably supports the handle rotation shaft. The front wheel 6 is a vehicle wheel disposed on the front side in the traveling direction of the vehicle body frame 2. The handle 7 is a member that is disposed on the front side in the traveling direction of the vehicle body frame 2 and is grasped by a driver in order to steer the two-wheeled motor vehicle 1. The fuel tank 8 is a container that is disposed on an upper side of the vehicle body frame 2 so as to store fuel therein. The engine 9 is a driving source that supplies driving force for rotating the rear wheel 13.

The seat 11 is a saddle-type seat which is disposed on the upper side of the vehicle body frame 2 and on which the driver rides. The swing arm 12 is a member of which the front end in the traveling direction is rotatably supported on the vehicle body frame 2 and the rear end in the traveling direction supports the rear wheel 13. The swing arm 12 rotates about the front end in the traveling direction so as to follow the movement of the rear wheel 13. The rear wheel 13 is a vehicle wheel disposed on the rear side in the traveling direction of the vehicle body frame 2. The rear suspension 14 is a shock absorbing device that suppresses the shock applied to the rear wheel 13 during traveling by uneven surfaces on the ground surface from being transmitted to the vehicle body frame 2. The controller 15 includes a CPU (not illustrated) that performs arithmetic processes, for example, and controls the entire two-wheeled motor vehicle 1 while receiving signals and the like output from the stroke sensor 70.

[Configuration of Front Fork]

Next, a schematic configuration of the first leg 4a of the front fork 4 according to the embodiment illustrated in FIG. 2 will be described. In this example, the front fork 4 of which the first leg 4a is a damping variable leg will be described. The configuration of the second leg of the front fork 4 may be the same as or different from the configuration of the first leg 4a which is a damping variable leg. When the configuration of the second leg is different from the configuration of the first leg 4a, the second leg may or may not include a shock-absorbing spring mechanism in a separate function front fork (SFF) structure or an optional mechanism such as an ordinary damper mechanism depending on the purpose.

The first leg 4a of the front fork 4 is disposed so as to be freely extended and compressed between the vehicle body frame 2 and the front wheel 6 of the two-wheeled motor vehicle 1 and supports the front wheel 6. The front fork 4 is a so-called inverted front fork in which the inner tube 30 is disposed close to the front wheel 6 and the outer tube 31 is disposed close to the vehicle body frame 2.

The first leg 4a includes the outer tube 31 provided on the upper end side of the front fork 4, the inner tube 30 provided on the lower end side of the front fork 4 and inserted so as to freely slide on an inner circumferential surface of the outer tube 31, a damping force variable device 200, and a stroke sensor unit 76 for the stroke sensor 70. The damping force variable device 200 controls the flow of the operating fluid enclosed in the first leg 4a so as to variably adjust damping force while generating the damping force. The stroke sensor unit 76 is disposed inside the inner tube 30 so as to detect an extension/compression amount of the first leg 4a.

Moreover, the first leg 4a includes a piston 45 inserted so as to freely slide on the inner circumferential surface of the inner tube 30 and a piston rod 34 provided so as to extend in an axial direction of the outer tube 31. The lower end of the piston rod 34 is connected to the piston 45, and the upper end of the piston rod 34 is attached to a cap 51 that is attached to the upper end side of the outer tube 31. The piston rod 34 is isolated from the outer tube 31 with the cap 51 interposed.

The inner tube 30 and the outer tube 31 are approximately cylindrical members disposed coaxially. In the following description, the direction of the central line of these cylinders is sometimes referred to as an "up-down direction," the side (vehicle body side) close to the vehicle body frame 2 is sometimes referred to as an "upper end side," and the side (axle side) close to the front wheel 6 is sometimes referred to as a "lower end side".

The first leg 4a includes an axle-side unit 32 that includes the inner tube 30 and is attached to the axle 5 of the front wheel 6 and a vehicle body-side unit 33 that includes the outer tube 31 and the piston rod 34 and is attached to the vehicle body. Moreover, the first leg 4a absorbs unevenness of the ground surface to suppress vibration of the two-wheeled motor vehicle 1 during traveling while supporting the axle 5 of the front wheel 6 with the aid of the axle-side unit 32 and the vehicle body-side unit 33 which move in the up-down direction in relation to each other.

First, the axle-side unit 32 will be described. The axle-side unit 32 includes a partition wall member 35 through which the piston rod 34 is slidably inserted, the approximately cylindrical inner tube 30 both ends of which are open and in which a portion of the partition wall member 35 is attached to the upper end, a ring 36 provided between the partition wall member 35 and the outer tube 31, an axle bracket (axle holding portion) 37 attached to the lower end of the inner tube 30 so as to support the axle 5, a seal 38 provided between the lower end of the inner tube 30 and the axle bracket 37, and the stroke sensor unit 76 provided in an inner space of the inner tube 30 on the lower side than the upper surface of the piston 45. A specific configuration of the stroke sensor unit 76 will be described later.

The partition wall member 35 includes a guide portion 39. The guide portion 39 is a cylindrical member provided in the upper end of the inner tube 30. The outer circumferential surface 39a of the guide portion 39 slides on the inner circumferential surface of the outer tube 31. The partition wall member 35 further includes a cylinder portion 40 disposed inside the inner tube 30. The cylinder portion 40 is a bottomed cylindrical member which is formed on the lower side of the guide portion 39 so as to be continuous to the guide portion 39. The outer diameter of the cylinder portion 40 is smaller than the outer diameter of the guide portion 39. The partition wall member 35 further includes a supply and discharge portion 43 provided in a bottom portion of the cylinder portion 40 so that the operating fluid can be supplied and discharged between an oil storage chamber 41 and an operating oil chamber 42. Examples of the operating fluid include oil, water, aqueous solution, gas, and the like. In the following description, although a case in which the operating fluid is oil is described, embodiments are not limited to such a case.

The guide portion 39 is formed of metal, for example. A ring groove 39b to which a convex portion 36a of the ring 36 that seals the space between the inner circumferential surface of the outer tube 31 and the partition wall member 35 is fitted is formed in the entire area in the circumferential direction of the outer circumferential surface 39a of the guide portion 39. Moreover, a lower end surface 39c of the guide portion 39 functions as an abutting surface that abuts against an upper end surface 30d of the inner tube 30. That is, the lower end surface 39c of the guide portion 39 is a surface orthogonal to the up-down direction and makes contact with the entire circumference of the upper end surface 30d of the inner tube 30 to seal the upper portion of a piston rod-side oil chamber 421. Further, the guide portion 39 guides the outer tube 31 while allowing the outer circumferential surface 39a to abut against the inner circumferential surface of the outer tube 31 with the ring 36 interposed. The guide portion 39 maintains the gap between the outer circumferential surface of the inner tube 30 and the inner circumferential surface of the outer tube 31 constant.

The cylinder portion 40 is formed of metal, for example, so that the direction of the central line corresponds to the up-down direction. Moreover, the cylinder portion 40 includes an inwardly facing portion 40a provided in the lower end of the cylinder portion 40 and formed so as to face the inner side in the radial direction to block an opening in the lower end of the cylinder portion 40. Further, a male screw 40b that is fastened to a female screw 30a formed in the inner tube 30 is formed in the outer circumferential surface of the upper end of the cylinder portion 40.

The supply and discharge portion 43 includes third and fourth paths 43a and 43b through which an oil storage portion 411 of the oil storage chamber 41 is connected to the piston rod-side oil chamber 421 of the operating oil chamber 42, a check valve 43c provided in the third path 43a so as to allow the flow of oil from the oil storage portion 411 to the piston rod-side oil chamber 421 and to block the flow of oil from the piston rod-side oil chamber 421 to the oil storage portion 411, and a throttle valve 43d provided in the fourth path 43b so as to restrict the flow of oil between the oil storage portion 411 and the piston rod-side oil chamber 421.

In the partition wall member 35 having the configuration described above, the inwardly facing portion 40a partitions the inner space of the inner tube 30 into a space on the upper side relative to the inwardly facing portion 40a and a space on the lower side relative to the inwardly facing portion 40a. The space on the upper side relative to the inwardly facing portion 40a forms a portion of the oil storage chamber 41 in which oil accumulates, and the space on the lower side relative to the inwardly facing portion 40a serves as the operating oil chamber 42 in which oil accumulates. The oil storage chamber 41 is partitioned by the partition wall member 35 inside the inner tube 30 and is formed closer to the upper end side relative to the partition wall member 35. The operating oil chamber 42 is partitioned by the partition wall member 35 inside the inner tube 30 and is formed closer to the lower end side relative to the partition wall member 35.

The portion which is the lower-side space in the oil storage chamber 41 and in which oil is stored is the oil storage portion 411, and the portion which is the upper-side space in the oil storage chamber 41 and in which air is stored is an air storage portion 412. Moreover, the air storage portion 412 functions as an air spring that absorbs impact transmitted to the front fork 4.

The inner tube 30 is formed of a conductive material such as aluminum or iron, for example. The outer diameter of the inner tube 30 is smaller than the inner diameter of the outer tube 31. A predetermined amount of oil is filled in the inner tube 30. The filled oil is electrically insulating oil which prevents electrical connection between the inner tube 30 and the outer tube 31.

Moreover, in a state in which the inner tube 30 advances into the outer tube 31, an annular oil chamber (annular space) 44 is formed between the outer circumferential surface of the inner tube 30 and the inner circumferential surface of the outer tube 31. The annular oil chamber 44 is surrounded by the inner tube 30, the outer tube 31, the guide portion 39, and the guide bush 49. Oil is filled in the annular oil chamber 44. A cross-sectional area of the annular oil chamber 44 is larger than a cross-sectional area of the piston rod 34.

The inner circumferential surface of the inner tube 30 has an inner diameter that is constant along the up-down direction so that the piston 45 of the vehicle body-side unit 33 slides smoothly. The female screw 30a is formed in the inner circumferential surface of the upper end of the inner tube 30. The outer circumferential surface of the inner tube 30 basically has an outer diameter that is constant along the up-down direction. Moreover, the male screw 30b is formed in the outer circumferential surface of the lower end of the inner tube 30. Further, a connection hole 46 through which the annular oil chamber 44 is communicated with the piston rod-side oil chamber 421 partitioned inside the inner tube 30 is formed at a position of the inner tube 30 on the lower side than the partition wall member 35 in a state in which the partition wall member 35 is attached to the inner tube 30.

The ring 36 is a ring-shaped member formed of an insulating material such as a resin, for example. Moreover, the ring 36 has the convex portion 36a formed so as to protrude from the inner circumferential surface of the ring 36 to face the inner side in the radial direction. The ring 36 is attached to the guide portion 39 when the convex portion 36a is fitted into the ring groove 39b of the guide portion 39. The ring 36 attached to the guide portion 39 is in a state of being sandwiched between the outer circumferential surface 39a of the guide portion 39 and the inner circumferential surface of the outer tube 31. The ring 36 is an insulating member which prevents electrical connection between the inner tube 30 and the outer tube 31.

The axle bracket 37 may be formed of an insulating material or a conductive material and may preferably be formed of a weather-resistant material. A concave portion 37a in which the inner tube 30 is inserted and an axle attachment hole 37b to which the axle 5 of the front wheel 6 can be attached are formed in the axle bracket 37. A female screw 37c that is fastened to the male screw 30b of the inner tube 30, a seal groove 37d to which the seal 38 is fitted, and a bottom portion 37e that covers the opening in the lower end of the inner tube 30 are formed in the concave portion 37a. The axle attachment hole 37b is formed as a through-hole that passes approximately through the central portion of the axle bracket 37. The axle bracket 37 is attached so as to block the lower end of the inner tube 30 when the male screw 30b of the inner tube 30 is fastened to the female screw 37c. The seal 38 is an approximately ring-shaped member formed of an insulating material such as a resin. The seal 38 is attached by being fitted into the seal groove 37d to seal the space between the outer circumferential surface of the inner tube 30 and the axle bracket 37 to thereby prevent leakage of the oil filled in the inner tube 30.

A suspension spring 26 is disposed between the lower end of the inner tube 30 and the piston 45. The upper end of the suspension spring 26 is in contact with the lower end of the piston 45, for example.

Next, the vehicle body-side unit 33 will be described. The vehicle body-side unit 33 includes the approximately cylindrical outer tube 31 of which both ends are open and the guide bush 49 and the seal 50 which are attached to the inner circumference of the lower end of the outer tube 31. Moreover, the vehicle body-side unit 33 includes the piston 45 that partitions the operating oil chamber 42 formed in the inner space of the inner tube 30 along the up-down direction into the piston rod-side oil chamber 421 disposed on the upper end side and the piston-side oil chamber 422 disposed on the lower end side, the piston rod 34 fixed to the piston 45 and provided so as to be extended toward the vehicle body frame 2, the cap 51 attached to the upper end of the outer tube 31 so as to block the upper-side opening of the outer tube 31, and the damping force variable device 200 provided in the piston 45.

Although the outer tube 31 is an approximately cylindrical member formed of a conductive material such as aluminum or iron, for example, the diameter of the lower end of the outer tube 31 is increased so that the guide bush 49 and the seal 50 can be held on the inner side of the outer tube 31. Moreover, a female screw 31a is formed in the inner circumferential surface of the upper end of the outer tube 31.

The guide bush 49 is a member for smoothening the sliding of the inner circumferential surface of the outer tube 31 in relation to the outer circumferential surface of the inner tube 30 and is a cylindrical bearing formed of an insulating material such as a resin, for example. The inner diameter of the guide bush 49 is set to be smaller than the inner diameter of the outer tube 31 so that the inner circumferential surface of the guide bush 49 protrudes toward the inner side further than the inner circumferential surface of the outer tube 31 in a state in which the guide bush 49 is attached to the outer tube 31.

The seal 50 is a member formed of an insulating material such as rubber, for example. The seal 50 prevents the outflow of the oil leaking from the guide bush 49 due to sliding of the outer tube 31 in relation to the inner tube 30.

The guide bush 49 and the seal 50 are formed of an insulating material as described above and prevent electrical connection between the inner tube 30 and the outer tube 31. Moreover, the guide bush 49 maintains the gap between the outer circumferential surface of the inner tube 30 and the inner circumferential surface of the outer tube 31 constant.

The piston 45 is a cylindrical member having a plurality of paths through which oil circulates. A ring groove 45h to which a ring 52 that seals the space between the outer circumferential surface of the piston 45 and the inner circumferential surface of the inner tube 30 is fitted is formed in the outer circumferential surface of the piston 45. The ring 52 fitted into the ring groove 45h is disposed between the outer circumferential surface of the piston 45 and the inner circumferential surface of the inner tube 30 so as to seal the flow of the oil in the piston rod-side oil chamber 421 which is positioned on the upper side than the ring 52 and in which the piston rod 34 is present and the oil in the piston-side oil chamber 422 which is positioned on the lower side than the ring 52.

Moreover, the damping force variable device 200 provided in the piston 45 has a function of adjusting damping force. The damping force variable device 200 includes main passages 121 and 122, a main valve 96, and a pilot passage 120 through which the piston rod-side oil chamber 421 is communicated with the piston-side oil chamber 422. Moreover, the damping force variable device 200 includes a compression-side inlet check valve 45b and a compression-side outlet check valve 45d that are provided in the main passage 121 so as to allow the flow of oil from the piston-side oil chamber 422 to the piston rod-side oil chamber 421 and to block the flow of oil from the piston rod-side oil chamber 421 to the piston-side oil chamber 422. Further, the damping force variable device 200 includes an extension-side inlet check valve 45c and an extension-side outlet check valve 45a that are provided in the main passage 122 so as to allow the flow of oil from the piston rod-side oil chamber 421 to the piston-side oil chamber 422 and to block the flow of oil from the piston-side oil chamber 422 to the piston rod-side oil chamber 421.

Moreover, the damping force variable device 200 includes an actuator used for adjusting the damping force. For example, a solenoid 90 is used as the actuator. A wire 29 for supplying electricity to the solenoid 90 is inserted into the piston rod 34 and the cap 51 from the upper side of the first leg 4a. Electricity is supplied to the solenoid 90 from the upper side of the first leg 4a through the wire 29 for supplying electricity to the solenoid 90. A specific configuration of the damping force variable device 200 will be described later.

The wire 29 is electrically connected to the solenoid 90 provided in the piston 45. The wire 29 is extended through the piston rod 34 and the cap 51 to the outside of the outer tube 31.

The piston rod 34 is a cylindrical member. The upper surface of the piston 45 is connected to the lower end of the piston rod 34. Moreover, the piston rod 34 is extended in the up-down direction and a male screw 34a is formed in the outer circumferential surface of the upper end of the piston rod 34.

The cap 51 is a disk-shaped member formed of an insulating material such as a resin, for example. A male screw 51a that is fastened to the female screw 31a formed in the inner circumferential surface of the outer tube 31 is formed in the outer circumferential surface of the cap 51. The cap 51 seals the outer tube 31 by fastening the female screw 31a of the outer tube 31 to the male screw 51a. Moreover, the cap 51 has a concave portion 51c in which the piston rod 34 is inserted. A female screw 51b that fastens the male screw 34a formed in the piston rod 34 is formed in the inner circumferential surface of the concave portion 51c. The cap 51 holds the piston rod 34 by fastening the male screw 34a of the piston rod 34 to the female screw 51b. Since the cap 51 is formed of an insulating material, electrical connection between the inner tube 30 and the outer tube 31 via the piston rod 34 and the piston 45 is prevented.

[Configuration of Damping Force Variable Device]

Next, the damping force variable device 200 provided in the first leg 4a will be described. FIG. 3 illustrates the damping force variable device 200 provided in the piston 45 of FIG. 2 in detail.

The piston 45 is divided into the two parts an upper piston 451 and a lower piston 452. The damping force variable device 200 is formed by assembling a valve stopper 91, an extension-side outlet check valve 45a, the lower piston 452, a compression-side inlet check valve 45b, an extension-side inlet check valve 45c, the upper piston 451, a compression-side outlet check valve 45d, a valve stopper 92, a valve seat member 93, and the solenoid 90 sequentially in the up-down direction (axial direction) from the lower end side.

A rod portion 93a protrudes integrally from the axial center of the valve seat member 93 toward the lower end side. The rod portion 93a passes through the center in the radial direction of the valve stopper 92, the compression-side outlet check valve 45d, the upper piston 451, the extension-side inlet check valve 45c, the compression-side inlet check valve 45b, the lower piston 452, the extension-side outlet check valve 45a, and the valve stopper 91, and a nut 94 engages with the lower end thereof.

A main valve member 95 fitted to the outer circumference of the rod portion 93a of the valve seat member 93 is received in a concave portion 452a of the lower piston 452. The approximately cylindrical main valve 96 is fitted and held on the outer circumference of the main valve member 95 so as to be slidable in the up-down direction. An annular pilot chamber (back pressure chamber) 97 partitioned by the main valve member 95 is formed in a portion of the concave portion 452a on a back surface side (the lower side in FIG. 3) of the main valve 96. A plate spring 98 that is biased in the upward direction (valve-closing side) in which the main valve 96 sits on the lower surface (sitting surface) of the upper piston 451 is accommodated in the pilot chamber 97.

A passage 99 is formed in the space between the concave portion 452a of the lower piston 452 and the outer circumference of the main valve 96. The passage 99 is connected to the pilot chamber 97 through a hole 96a formed in the main valve 96.

A space 100 is formed in an inner circumference of the lower portion of the upper piston 451. A hole 451a that passes in the axial direction and an oblique hole 451b are formed in the upper piston 451. Here, the hole 451a is normally open to the piston rod-side oil chamber 421 in the inner tube 30 and is selectively opened and closed by the extension-side inlet check valve 45c. Moreover, the hole 451b is normally open to the space 100 and is selectively opened and closed by the compression-side outlet check valve 45d.

A space 101 is formed in an inner circumference of the lower portion of the lower piston 452. Moreover, a hole 452b that passes in the axial direction and an oblique hole 452c are formed in the lower piston 452. Here, the hole 452b is normally open to the piston-side oil chamber 422 formed in the inner tube 30 and is selectively opened and closed by the compression-side inlet check valve 45b. Moreover, the hole 452c is normally open to the space 101 and is selectively opened and closed by the extension-side outlet check valve 45a.

A concave portion 93b of which the upper end side is open is formed in an upper portion at the axial center of the valve seat member 93. A hole 93c is formed so as to extend from the concave portion 93b toward the lower end side along the axial center of the rod portion 93a. A hole 93d is formed so as to extend vertically from the lower end of the hole 93c toward the outer side in the radial direction. The hole 93d is connected to the pilot chamber 97 through a hole (not illustrated) formed in the main valve member 95 along the radial direction.

A plurality of holes 95a that passes in the axial direction is formed in the main valve member 95. These holes 95a have one set of ends (upper ends) connected to the hole 451b of the upper piston 451 through the space 100 of the upper piston 451 and the other set of ends (lower ends) connected to the hole 452c of the lower piston 452 through the space 101 of the lower piston 452.

An axial gap 103 is formed between the upper piston 451 and the lower piston 452 by a ring-shaped distance collar 102 fitted to the outer circumferences of the upper piston 451 and the lower piston 452. The extension-side inlet check valve 45c and the compression-side inlet check valve 45b are provided in the gap 103. The compression-side inlet check valve 45b and the extension-side inlet check valve 45c are biased in the direction of closing the hole 451a of the upper piston 451 and the hole 452b of the lower piston 452 by a plate spring 47 interposed between these valves 45b and 45c.

Here, a configuration of the solenoid 90 will be described. The solenoid 90 has a cylindrical case 104 of which the inner circumference of the lower end opening thereof engages with the outer circumference of the valve seat member 93. Cores 105 and 106 of a bottom cylinder, an annular coil 107, a plunger 108 received in the cores 105 and 106, a hollow operating rod 109 that passes through the axial center of the plurality of 108, and the like are accommodated in the case 104. The operating rod 109 has both ends in the axial direction that are supported by cylindrical guide bushes 110 and 111 so as to be movable in the axial direction. A pilot valve 112 is fitted to an outer circumference of the lower end of the operating rod 109 that faces the inside of the concave portion 93b of the valve seat member 93.

The pilot valve 112 engages with the inner circumference of the concave portion 93b of the valve seat member 93 so as to be movable in the axial direction and opens and closes the hole 93c by selectively sitting on a tapered valve seat 93e formed on the upper end of the hole 93c that is formed at the axial center of the valve seat member 93. Here, a space 113 partitioned by the pilot valve 112 is formed in the concave portion 93b of the valve seat member 93. A spring 114 that biases the pilot valve 112 in a valve-opening direction (the upward direction in FIG. 3) is accommodated in the space 113. Here, the space 113 formed in the valve seat member 93 is connected to the pilot chamber 97 through a hole (not illustrated) formed in the main valve member 95 that is formed in the holes 93c and 93d of the valve seat member 93. Moreover, a hole 112a is formed in the pilot valve 112. The hole 112a is normally open to the space 113.

A recessed space 115 is formed between the valve seat member 93 and the end surface of the core 105 of the solenoid 90. A fail valve 116 that selectively opens and closes the hole 112a of the pilot valve 112 is formed in the space 115. The fail valve 116 is held on the outer circumference of the operating rod 109 so as to be slidable in the up-down direction and is biased in a valve-closing direction (the lower end side in FIG. 3) by the spring 117 accommodated in the space 115. A spring constant of the spring 117 is set to be smaller than a spring constant of the spring 114 that biases the pilot valve 112 in the valve-opening direction.

A hole 93f that passes through the axial direction is formed in the valve seat member 93. The space 115 is connected to the space 100 of the upper piston 451 through a hole 93f, a cylindrical passage 118 formed between the valve stopper 92 and the valve seat member 93, and a cylindrical passage 119 formed between the upper piston 451 and the rod portion 93a of the valve seat member 93.

In the damping force variable device 200 having such a configuration, the hole 452b of the lower piston 452, the gap 103, the space 100 of the upper piston 451, and the hole 451b of the upper piston 451 form the main passage 121 during compression-side stroke. In the main passage 121, the main valve 96, the compression-side inlet check valve 45b, and the compression-side outlet check valve 45d are provided. Moreover, the hole 451a of the upper piston 451, the gap 103, the hole 95a of the main valve member 95, and the hole 452c of the lower piston 452 form the main passage 122 during extension-side stroke. In the main passage 122, the main valve 96, the extension-side inlet check valve 45c, and the extension-side outlet check valve 45a are provided.

The gap 103 between the upper piston 451 and the lower piston 452, the passage 99 formed on the outer circumference side of the main valve 96, the hole 96a of the main valve 96, the pilot chamber 97, the hole (not illustrated) formed in the main valve member 95, the holes 93c and 93d formed in the valve seat member 93, the space 113 formed by the pilot valve 112 and the valve seat member 93, the hole 112a formed in the pilot valve 112, the space 115 formed in the core 105 of the solenoid 90, the hole 93f formed in the valve seat member 93, the passage 118 formed between the valve stopper 92 and the valve seat member 93, the passage 119 connected to the passage 118, and the space 100 of the upper piston 451 form the pilot passage 120 during compression-side stroke and extension-side stroke. In the pilot passage 120, the pilot valve 112 and the fail valve 116 are formed. Here, the passage 99 and the hole 96a of the main valve 96 also function as a bypass passage that guides a portion of the oil flowing through the main passages 121 and 122 toward the pilot chamber 97.

The operation during compression-side stroke and extension-side stroke of the front fork 4 having such a configuration will be described with reference to FIGS. 4 and 5.

(Compression-Side Stroke)

First, the behavior of the damping force variable device 200 during compression-side stroke of the front fork 4 will be described with reference to FIG. 4.

During compression of the front fork 4, when the axle-side unit 32 moves upward in relation to the vehicle body-side unit 33, the position of the piston 45 in the inner tube 30 moves relatively downward and the pressure in the piston-side oil chamber 422 increases. The oil in the piston-side oil chamber 422 flows into the piston rod-side oil chamber 421 through the main passage 121 during compression-side stroke. Specifically, as indicated by the solid-line arrow in FIG. 4, the oil flows from the piston-side oil chamber 422 to pass through the hole 452b of the lower piston 452 to push and open the compression-side inlet check valve 45b while resisting against the biasing force of the plate spring 47 to flow into the gap 103. The oil pushes and opens the main valve 96 with the pressure thereof while resisting against the force in the valve-closing direction of the back pressure of the pilot chamber 97 and the plate spring 47 to flow from the gap 103 through the hole 451b of the upper piston 451 via the space 100 to push and open the compression-side outlet check valve 45d to flow into the piston rod-side oil chamber 421. In this case, with the flow resistance of the oil when passing through the main valve 96, damping force during compression-side stroke is generated in the first leg 4a.

On the other hand, a portion of the oil flowing from the piston-side oil chamber 422 into the gap 103 through the hole 452b of the lower piston 452 converges with the oil flowing in the main passage 121 through the pilot passage 120. Specifically, as indicated by the broken-line arrow in FIG. 4, a portion of the oil flowing from the piston-side oil chamber 422 into the gap 103 through the hole 452b of the lower piston 452 flows from the passage 99 on the outer circumference side of the main valve 96 into the pilot chamber 97 while passing through the hole 96a of the main valve 96 and flows from the pilot chamber 97 into the space 113 of the valve seat member 93 while passing through the hole (not illustrated) of the main valve member 95, the holes 93d and 93c of the valve seat member 93, and the gap between the pilot valve 112 and the valve seat 93e. The oil flowing into the space 113 of the valve seat member 93 passes through the hole 112a of the pilot valve 112 to push and open the fail valve 116 while resisting against the biasing force of the spring 117 to flow into the space 115 of the core 105, flows from the space 115 into the space 100 of the upper piston 451 through the hole 93f of the valve seat member 93 and the passages 118 and 119, and converges with the oil flowing in the main passage 121 in the space 100.

Here, by driving the solenoid 90 to move the operating rod 109 and the pilot valve 112 fitted to the operating rod 109 in the axial direction to change the opening of the pilot valve 112, it is possible to adjust the flow resistance of the oil passing through the pilot valve 112 to adjust the back pressure of the pilot chamber 97. Moreover, it is possible to control the force that presses the main valve 96 in the valve-closing direction with the back pressure to adjust the opening of the main valve 96. By adjusting the opening of the main valve 96 in this manner, it is possible to adjust the damping force generated by the flow resistance of the oil passing through the main valve 96. Specifically, when the opening of the pilot valve 112 is decreased, the back pressure of the pilot chamber 97 increases, the opening of the main valve 96 decreases, and the damping force increases. On the other hand, when the opening of the pilot valve 112 is increased, the opening of the main valve 96 also increases and the damping force decreases.

As described above, for example, the solenoid 90 and the pilot valve 112 which is fitted to the solenoid 90 and is provided on the pilot passage 120 are provided. By controlling the solenoid 90 to move the pilot valve 112 in the axial direction to change the opening of the pilot valve 112, it is possible to adjust the flow resistance of the oil passing through the pilot valve 112 to adjust the back pressure of the pilot chamber 97 and the internal pressure of the pilot passage 120. That is, the solenoid 90 and the pilot valve 112 function as a control mechanism that controls the internal pressure of the pilot chamber 97 and the pilot passage 120.

Here, in compression-side stroke, an amount of oil corresponding to the volume of the piston rod 34 advancing into the inner tube 30 is delivered from the piston rod-side oil chamber 421 in the inner tube 30 to the annular oil chamber 44 through the connection hole 46. In this case, since an increase in volume $\Delta V_1$ (supply amount) of the annular oil chamber 44 is larger than an increase in volume $\Delta V_2$ of the piston rod 34, a deficit "$\Delta V_1 - \Delta V_2$" among the supply amount of the oil supplied to the annular oil chamber 44 is supplied from the oil storage portion 411 to the piston rod-side oil chamber 421. The supply of the deficit amount of oil is performed by the supply and discharge portion 43 which is formed in the bottom portion of the cylinder portion 40 so as to enable oil to be supplied and discharged between the oil storage portion 411 and the piston rod-side oil chamber 421.

(Extension-Side Stroke)

Next, the behavior of the damping force variable device 200 during extension-side stroke of the front fork 4 will be described with reference to FIG. 5.

During extension of the front fork 4, when the axle-side unit 32 moves downward in relation to the vehicle body-side unit 33, the position of the piston 45 in the inner tube 30 moves relatively upward and the pressure in the piston-side oil chamber 422 becomes negative. The oil in the piston rod-side oil chamber 421 flows into the piston-side oil chamber 422 through the main passage 122 during extension-side stroke. Specifically, as indicated by the solid-line arrow in FIG. 5, the oil flows from the piston rod-side oil chamber 421 to pass through the hole 451a of the upper piston 451 to push and open the extension-side inlet check valve 45c while resisting against the biasing force of the plate spring 47 to flow into the gap 103. The oil pushes and opens the main valve 96 with the pressure thereof while resisting against the force in the valve-closing direction of the back pressure of the pilot chamber 97 and the plate spring 47 to flow from the gap 103 through the hole 95a of the main valve member 95 and the hole 452c of the lower piston 452 to push and open the extension-side outlet check valve 45a to flow into the piston-side oil chamber 422. In this case, with the flow resistance of the oil when passing through the main valve 96, damping force during extension-side stroke is generated in the first leg 4a.

On the other hand, a portion of the oil flowing from the piston rod-side oil chamber 421 into the gap 103 through the hole 451a of the upper piston 451 converges with the oil flowing in the main passage 122 through the pilot passage 120 similarly to the compression-side stroke. Here, the flow of the oil in the pilot passage 120 is indicated by the broken-line arrow in FIG. 5.

Here, in extension-side stroke, an amount of oil corresponding to the volume of the piston rod 34 exiting from the inner tube 30 is delivered from the annular oil chamber 44 to the piston rod-side oil chamber 421 through the connection hole 46. In this case, since a decrease in volume $\Delta V_3$ (discharge amount) of the annular oil chamber 44 is larger than a decrease in volume $\Delta V_4$ of the piston rod 34, a surplus "$\Delta V_3 - \Delta V_4$" among the discharge amount of the oil discharged from the annular oil chamber 44 is discharged from the piston rod-side oil chamber 421 to the oil storage portion 411. The discharge of the surplus amount of oil is performed by the supply and discharge portion 43 which is formed in the bottom portion of the cylinder portion 40 so as to enable oil to be supplied and discharged between the oil storage portion 411 and the piston rod-side oil chamber 421.

Here, a hydraulic circuit of the first leg 4a of the front fork 4 according to the embodiment will be described. The hydraulic circuit illustrated in FIG. 6 includes the compression-side inlet check valve 45b, the compression-side outlet check valve 45d, the extension-side inlet check valve 45c, the extension-side outlet check valve 45a, the main valve 96, the pilot passage 120, the annular oil chamber 44, the piston rod-side oil chamber 421, the piston-side oil chamber 422, and the oil storage chamber 41. Moreover, as illustrated in FIG. 6, a vehicle body-side attachment member 61, for example, is provided in the upper end of the piston rod 34. On the other hand, an axle-side attachment member 62, for example, is provided in the lower end of the inner tube 30. That is, the upper end of the piston rod 34 in which the vehicle body-side attachment member 61 is provided is on the vehicle body side, and the lower end of the inner tube 30 in which the axle-side attachment member 62 is provided is on the axle side.

Moreover, in the hydraulic circuit illustrated in FIG. 6, the oil storage chamber 41 is provided so as to be connected directly to the piston rod-side oil chamber 421. The oil storage chamber 41 includes an orifice, a check valve, and the like which are not illustrated, for example, in order to supply a predetermined amount of oil to the oil storage chamber 41 and adjusts the amount of oil introduced thereto.

In the first leg 4a having such a hydraulic circuit, the flow of oil during compression-side stroke is indicated by a solid-line arrow in the hydraulic circuit illustrated in FIG. 6. In compression-side stroke in which the inner tube 30 moves upward in relation to the outer tube 31, the oil in the piston-side oil chamber 422 is compressed by the piston 45 and the pressure thereof increases. In this case, as described above, the oil in the piston-side oil chamber 422 flows into the piston rod-side oil chamber 421 through the main passage 121 during compression-side stroke. In this case, the flow resistance of the oil when passing through the main valve 96, damping force during compression-side stroke is generated in the first leg 4a.

In extension-side stroke of the front fork 4, the flow of oil is indicated by a broken-line arrow in the hydraulic circuit illustrated in FIG. 6. In extension-side stroke in which the inner tube 30 moves downward in relation to the outer tube 31, the oil in the piston rod-side oil chamber 421 is compressed by the piston 45, and the pressure thereof increases. In this case, as described above, the oil in the piston rod-side oil chamber 421 flows into the piston-side oil chamber 422 through the main passage 122 during extension-side stroke. In this case, with the flow resistance of the oil when passing through the main valve 96, damping force during extension-side stroke is generated in the first leg 4a.

As described above, the front fork 4 having the damping force variable device 200 absorbs impact during traveling of the two-wheeled motor vehicle 1 having the first leg 4a attached thereto while being extended and compressed. The annular oil chamber 44 maintains the state of being filled with oil regardless of the extension or compression state of the first leg 4a.

[Configuration of Stroke Sensor]

Figure 7:
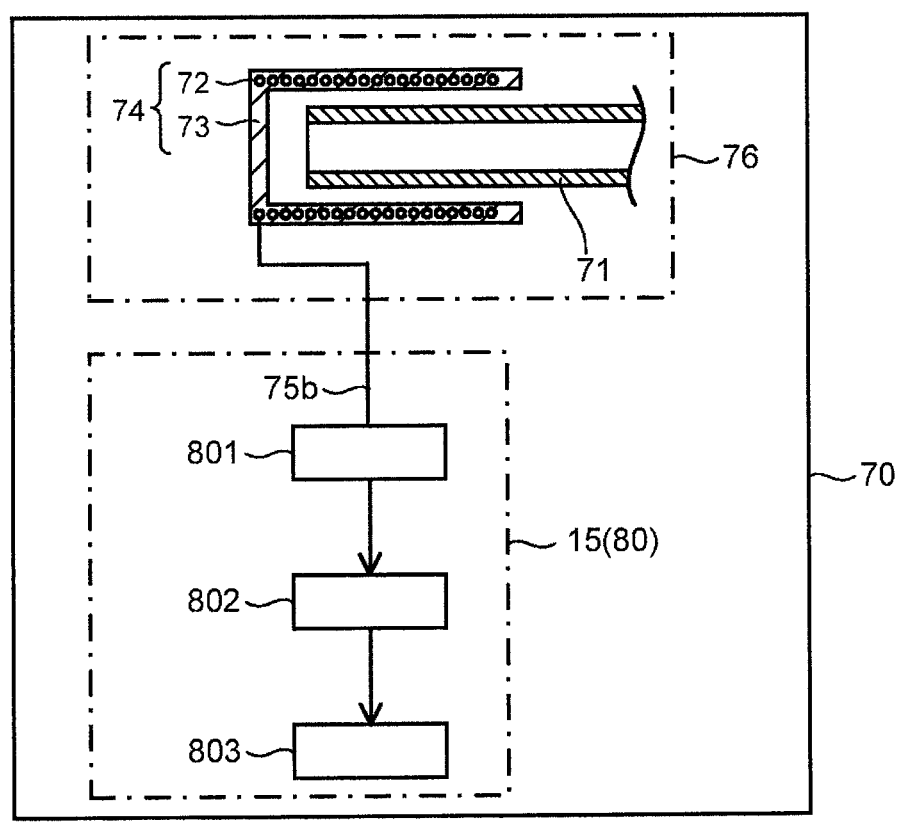
FIG. 7 is a block diagram schematically illustrating a schematic configuration of a stroke sensor unit and a detecting unit provided in the first leg of the front fork according to the embodiment.
Figure 8:
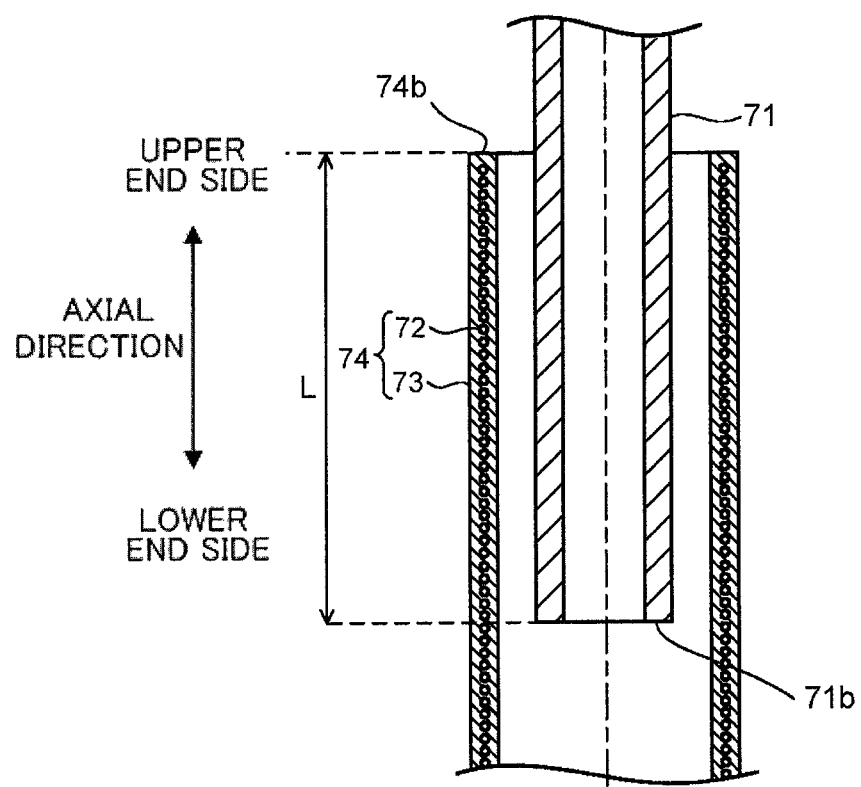
FIG. 8 is a diagram for schematically describing a relative position of a conductor member and a coil portion.

FIG. 7 is a block diagram schematically illustrating a schematic configuration of the stroke sensor unit 76 and a detecting unit 80 provided in the first leg 4a of the front fork 4 according to the embodiment. FIG. 8 is a diagram for schematically describing a relative position of a conductor member 71 and a coil portion 74 having a coil conductor 72. In FIG. 8, members other than the conductor member 71, the coil conductor 72, an insulating member 73, and the coil portion 74 are omitted for clarity and the shapes of some members are simplified.

The stroke sensor unit 76 provided in the first leg 4a, illustrated in FIG. 7 will be described. The stroke sensor 70 which is an example of a stroke sensor used in the first leg 4a includes a detecting unit 80 that detects a stroke amount of the first leg 4a based on a change occurring in inductance of the coil conductor 72. Although an example in which the configuration of the detecting unit 80 is provided in the controller 15 is illustrated, the configuration of the detecting unit 80 is not limited to this but the detecting unit 80 may not be provided in the controller 15.

The stroke sensor unit 76 is provided in the inner space of the inner tube 30 and includes the conductor member 71 attached to the piston 45 and the cylindrical coil portion 74 having the coil conductor 72 therein. The coil portion 74 includes the coil conductor 72 and the cylindrical insulating member 73 having the coil conductor 72 therein. The coil conductor 72 is provided along in the insulating member 73 in the axial direction. The coil conductor 72 may be covered with an insulating member, for example. Moreover, a wire 75a for supplying electricity to the coil portion 74 is inserted into the insulating member 73 from the vicinity of the lower end of the first leg 4a. Electricity is supplied from the vicinity of the lower end of the first leg 4a to the coil portion 74 through the wire 75a for supplying electricity to the coil portion 74.

The wire 75a is electrically connected to the coil conductor 72 provided in the insulating member 73. For example, the wire 75a is connected to the lower end of the coil conductor 72 so as to be extended to the outside of the inner tube 30. The wire 75a is bonded to the coil conductor 72 by a well-known method such as soldering or welding.

The conductor member 71 is attached to the piston 45 so that the direction of the central line corresponds to the axial direction. The upper end of the conductor member 71 is attached to the lower portion of the piston 45 and the conductor member 71 is extended to the lower end side along the axial direction. The material of the conductor member 71 may be a material that carries electricity and may not be a ferromagnetic material. Preferably, the material of the conductor member 71 is a non-magnetic material that carries electricity or a material having small magnetism. For example, examples of the conductor member 71 include aluminum, brass, copper, and the like. When the material of the conductor member 71 is a ferromagnetic material such as iron or a slit extending in the axial direction is formed in the conductor member 71, since there is no correlation between a change in inductance of the coil conductor 72 and a change in an insertion length L, it is not suitable for a stroke sensor. Although the conductor member 71 illustrated in FIGS. 2, 7, and 8 is cylindrical, as described later as long as the conductor member 71 is inserted in the coil portion 74 and a change ΔL of the insertion length L of the conductor member 71 inserted in the coil portion 74 can be detected, the shape of the conductor member 71 is not particularly limited, and for example, the conductor member 71 may have a solid rod shape. In the following description, although the conductor member 71 having a cylindrical shape is described, in the embodiments, the shape is not limited to such a shape.

A concave portion 45i in which the upper end of the conductor member 71 is inserted is formed in a lower portion of the piston 45. A female screw that is fastened to a male screw (not illustrated) formed in the upper end of the conductor member 71, for example, is formed in the inner circumference of the concave portion 45i. The piston 45 holds the conductor member 71 by fastening the male screw of the conductor member 71 to the female screw.

The coil conductor 72 is provided inside the insulating member 73. The coil conductor 72 is formed of a lead wire wound in a spiral form. The inner diameter of the coil conductor 72 is larger than the outer diameter of the conductor member 71.

Here, for example, when the first leg 4a is extended to its full extent, at least a portion on the lower end side of the conductor member 71 is inserted in the coil conductor 72 provided inside the coil portion 74. That is, a portion of the conductor member 71 always overlaps the coil conductor 72. Due to this, the stroke in the full extension state of the first leg 4a can be measured by the stroke sensor unit 76. However, the present invention is not limited to this, and it is not necessary to measure the stroke in the full extension state of the first leg 4a. When it is aimed to measure only a certain stroke amount of the first leg 4a, the conductor member 71 may have a portion that does not overlap the coil conductor 72.

Moreover, when the first leg 4a is compressed to its full extent, at least a portion on the lower end side of the conductor member 71 overlaps the coil conductor 72 provided in the coil portion 74. Due to this, the stroke in the full compression state of the first leg 4a can be also measured by the stroke sensor unit 76. However, the present invention is not limited to this, and it is not necessary to measure the stroke in the full compression state of the first leg 4a. When it is aimed to measure only a certain stroke amount of the first leg 4a, the conductor member 71 may have a portion that does not overlap the coil conductor 72.

The insulating member 73 includes the coil conductor 72 therein. Preferably, the coil conductor 72 is provided inside the insulating member 73 so that the central line of the coil conductor 72 overlaps the central line of the coil portion 74. The insulating member 73 is formed of an insulating material, and preferably, formed of an insulating material having weather resistance and oil resistance. Moreover, a difference in the thermal expansion coefficient between the insulating member 73 and the conductor member 71 is preferably small, and more preferably, the difference in the thermal expansion coefficient between the insulating member 73 and the conductor member 71 is substantially zero. Examples of the insulating member 73 include a polyphenylene sulfide resin (PPS), a liquid crystal polymer resin (LCP), and the like.

The cylindrical coil portion 74 having the coil conductor 72 and the insulating member 73 is provided so that the inner circumference of the coil portion 74 faces the outer circumference of the conductor member 71 in the axial direction. The inner diameter of the coil portion 74 is larger than the outer diameter of the conductor member 71.

The coil portion 74 has a convex portion 74a formed so as to protrude from the outer circumference of the lower end of the coil portion 74 toward the outer side in the radial direction. Moreover, a supporting member 28 that supports the inner tube 30 is formed in the lower end of the inner tube 30. A concave portion 28a in which the lower end of the coil portion 74 is inserted is formed in the supporting member 28. A ring groove 28b in which the convex portion 74a of the coil portion 74 is fitted is formed in the entire area in the circumferential direction of the inner circumference of the concave portion 28a. The coil portion 74 is attached to the lower end of the inner tube 30 by fitting the convex portion 74a into the ring groove 28b of the supporting member 28.

The insulating member 73 of the coil portion 74 may be integrated with the supporting member 28.

The lower end of the coil portion 74 is attached to the axle bracket 37 that is attached to the lower end side of the inner tube 30 with the supporting member 28 interposed, and the coil portion 74 is extended toward the upper end side along the axial direction. Preferably, the lower end of the coil portion 74 is attached to the axle bracket 37 with the supporting member 28 interposed so that the central line of the coil portion 74 overlaps the central line of the conductor member 71. With extension and compression of the first leg 4a (that is, the movement in the axial direction of the inner tube 30 in relation to the outer tube 31), the coil portion 74 moves together with the inner tube 30 to allow a portion of the conductor member 71 to be inserted into the coil portion 74.

The detecting unit 80 (the controller 15) can detect the stroke amount of the front fork 4 based on a change occurring in inductance of the coil conductor 72. The detecting unit 80 is connected to the coil conductor 72 via a wire 75b. The detecting unit 80 includes a CPU that performs an arithmetic process for calculating a stroke position and a stroke speed of the first leg 4a, a ROM that stores programs executed by the CPU and various items of data and the like, a RAM used as a work memory or the like of the CPU, an electrically erasable and programmable read only memory (EEPROM), and the like. The EEPROM is a type of nonvolatile memories, and is used for storing data and the like that are to be maintained even when the power of the detecting unit 80 is turned off, for example.

The detecting unit 80 includes an oscillation circuit 801, a timer unit 802, and an arithmetic unit 803, for example.

The oscillation circuit 801 is electrically connected to the coil conductor 72 provided in the coil portion 74 from the lower end side of the first leg 4a via the wire 75b. A change in inductance of the coil conductor 72 is transmitted from the lower side of the first leg 4a to the oscillation circuit 801 via the wire 75b. The oscillation circuit 801 detects the inductance (inductance information) of the coil conductor 72 and performs oscillation at a cycle (frequency) corresponding to the change in inductance of the coil conductor 72. By employing an LC oscillation system in which a change occurring in oscillation frequency due to a change in inductance of the coil conductor 72 is detected as a signal, it is possible to increase the accuracy and resolution when reading the stroke amount.

The timer unit 802 measures the waveform (frequency) oscillated by the oscillation circuit 801 and outputs a frequency value (sensor value) corresponding to the stroke amount resulting from the extension and compression of the front fork 4.

The arithmetic unit 803 performs a predetermined arithmetic operation based on the frequency value (the sensor value) output from the timer unit 802 and a table recorded in a recording unit (not illustrated) to calculate a stroke position and a stroke speed of the first leg 4a. Here, the recording unit records the table (not illustrated) in which a relation between the sensor value corresponding to the change in inductance of the coil conductor 72 and the stroke position of the first leg 4a are determined in advance.

In this embodiment, although an example in which the oscillation circuit 801, the timer unit 802, and the arithmetic unit 803 are provided in the detecting unit 80 has been illustrated, at least one of these units may be provided in the stroke sensor unit 76 (that is, the first leg 4a). In particular, when all of the oscillation circuit 801, the timer unit 802, and the arithmetic unit 803 are provided in the insulating member 73, it is possible to design the first leg 4a in a more compact size.

The wire 75b is electrically connected to the coil conductor 72 provided in the insulating member 73. For example, the wire 75b is connected to the vicinity of the lower end of the coil conductor 72. The wire 75b is bonded to the coil conductor 72 by a well-known method such as soldering or welding, for example.

Next, the operation of the stroke sensor 70 including the stroke sensor unit 76 disposed in series to the lower end side of the damping force variable device 200 having the above-described configuration will be described with reference to FIGS. 7 and 8.

When a stroke amount of the first leg 4a changes, the inner tube 30 and the outer tube 31 move in the axial direction in relation to each other and the insertion length L of the conductor member 71 inserted in the coil portion 74 changes.

Here, when electricity flows into the coil conductor 72 attached to the lower end of the inner tube 30, for example, a magnetic flux is generated on the same axis as the first leg 4a so as to pass through the inner circumference of the coil conductor 72. With this magnetic flux, eddy current is generated in the conductor member 71.

When the magnetic flux generated in the coil conductor 72 increases, a magnetic flux in the opposite direction to the magnetic flux generated in the coil conductor 72 is generated in the conductor member 71 due to the eddy current generated in the conductor member 71 to decrease the magnetic flux generated by the coil conductor 72. On the other hand, when the magnetic flux generated in the coil conductor 72 decreases, a magnetic flux in the same direction as the magnetic flux generated in the coil conductor 72 is generated in the conductor member 71 due to the eddy current generated in the conductor member 71 to increase the magnetic flux generated by the coil conductor 72.

For example, in compression-side stroke, when the first leg 4a is compressed so that the insertion length L of the conductor member 71 inserted in the coil conductor 72 increases, the inductance of the coil conductor 72 itself decreases so that the magnetic flux of the coil conductor 72 itself decreases. On the other hand, in extension-side stroke, when the first leg 4a is extended so that the insertion length L of the conductor member 71 inserted in the coil conductor 72 decreases, the inductance of the coil conductor 72 itself increases so that the magnetic flux of the coil conductor 72 itself increases.

In this manner, the inductance of the coil conductor 72 changes due to a magnetical change near the coil conductor 72 resulting from a change in the insertion length L. During traveling of a two-wheeled motor vehicle, when the first leg 4a is extended and compressed, the conductor member 71 moves in the axial direction together with the inner tube 30, whereby a change in the stroke of the first leg 4a appears as a change in the insertion length L. Due to this, the change in the insertion length L can be detected as a change in the inductance of the coil conductor 72.

The detecting unit 80 detects a change in oscillation frequency resulting from the change in inductance. Due to this, by storing a table in which the stroke of the first leg 4a corresponding to the oscillation frequency resulting from the change in inductance of the coil conductor 72 is calculated and recorded in the detecting unit 80 in advance, it is possible to detect the stroke amount of the first leg 4a.

The stroke amount of the front fork means the amount of change of the position of the axle-side unit 32 in relation to the vehicle body-side unit 33 from a predetermined reference position along the axial direction. Moreover, the insertion length L of the conductor member 71 inserted in the coil portion 74 means the length of an area in which the outer circumference of the conductor member 71 faces the inner circumference of the coil portion 74 along the axial direction. The insertion length L in FIG. 8 is the distance in the axial direction between the upper end 74b of the coil portion 74 and the lower end 71b of the conductor member 71.

The change in inductance of the coil conductor 72 is substantially linear to the change in the insertion length L.

Moreover, when the first leg 4a is extended to its full extent, since at least a portion of the lower end side of the conductor member 71 is inserted in the coil conductor 72 provided inside the coil portion 74, even when the first leg 4a is in a reference length state, at least a portion on the lower end side of the conductor member 71 is inserted in the coil conductor 72. That is, even when the first leg 4a is in the reference length state, predetermined inductance of the coil conductor 72 is obtained.

As a specific operation of the detecting unit 80, as illustrated in FIG. 7, a signal associated with the inductance of the coil conductor 72 corresponding to the change in the insertion length L is output to the oscillation circuit 801 via the wire 75b.

The oscillation circuit 801 performs oscillation at a cycle corresponding to the change in inductance of the coil conductor 72 based on the signal from the wire 75b. Subsequently, the timer unit 802 outputs a sensor value corresponding to the stroke position of the first leg 4a by measuring the oscillation cycle of the oscillation circuit 801.

Subsequently, the arithmetic unit 803 calculates the stroke position of the first leg 4a based on the sensor value output from the timer unit 802 and the table recorded in the recording unit. Further, the arithmetic unit 803 differentiates the stroke position to calculate the stroke speed.

When the front fork 4 is extended and compressed during traveling of the two-wheeled motor vehicle 1, the coil conductor 72 in the coil portion 74 attached to the lower end of the inner tube 30 moves in the axial direction together with the inner tube 30. In this way, the length of the portion which is located between the upper end 74b of the coil portion 74 and the lower end 71b of the conductor member 71 in the axial direction and in which the inner circumference of the coil conductor 72 in the coil portion 74 faces the outer circumference of the conductor member 71 changes. When the length in the axial direction of the portion in which the coil conductor 72 and the conductor member 71 face changes, the inductance of the coil conductor 72 changes. The sensor value corresponding to the inductance value of the coil conductor 72 changing with time is compared with a sensor value which is recorded in advance and corresponds to the inductance value of the coil conductor 72 of the first leg 4a in the reference length state. In this way, it is possible to detect the stroke position and the stroke amount of the first leg 4a which is the extension/compression amount of the first leg 4a in relation to the reference length of the first leg 4a.

The stroke sensor 70 having the stroke sensor unit 76 can detect a change in inductance of the coil conductor 72 provided in the insulating member 73 of the coil portion 74 and detect a change ΔL of the insertion length L of the conductor member 71 inserted in the coil portion 74 based on the change in inductance. The change ΔL corresponds to the stroke amount of the first leg 4a.

Moreover, the stroke sensor unit 76 functions as a sensor element for the stroke sensor capable of detecting a change in the length in the axial direction of the portion in which the outer circumference of the conductor member 71 entering in the coil portion 74 from the opening of the upper end of the cylindrical coil portion 74 overlaps the inner circumference of the coil portion 74 based on the change in inductance of the coil conductor 72.

As described above, the front fork according to the embodiment includes a first leg having the structures of the stroke sensor units for the damping force variable device and the stroke sensor which provide different effects to the front fork. Since the damping force variable device and the stroke sensor are provided in the first leg which is a single damping variable leg, two different functions can be integrated in the single damping variable leg. Thus, it is possible to perform calibration of the damping force variable device and the stroke sensor of the single leg simultaneously. Due to this, as compared to the conventional front fork in which the structures of the damping force variable device and the stroke sensor are provided in the individual legs, it is possible to simplify the operation steps required for calibration and to shorten the operation time. Thus, the cost performance is improved. Further, since the front fork according to the embodiment in which the individual damping variable legs are calibrated simultaneously can be managed easily as compared to the conventional front fork in which respective legs calibrated individually are assembled, it is possible to reduce the manufacturing cost of the front fork.

Moreover, when the damping variable leg only has the structures of the damping force variable device and the stroke sensor, the structures of the damping force variable device and the stroke sensor may not be provided to the second leg of the front fork. That is, the space corresponding to the volume occupied by the structures of the damping force variable device and the stroke sensor can be secured in the second leg. This space can be used for other structures (for example, the structure of a vehicle height adjustment mechanism) useful for the front fork and can be used for other purposes. Thus, the degree of freedom in design of the front fork increases.

Moreover, in the front fork according to the embodiment, the damping force variable device is connected to an external power supply from the upper end side of the front fork via a wire, and the stroke sensor unit is connected to the external power supply from the lower end side of the front fork via a wire. Since the wire for the damping force variable device and the wire for the stroke sensor are led out from different positions of the front fork (that is, the wires are led out separately from the upper end side and the lower end side), it is possible to reduce the size of the front fork. Further, as compared to a case in which the wire for the damping force variable device and the wire for the stroke sensor are led out from the same side of the front fork (for example, the upper end side (or the lower end side)), for example, it is possible to design the layout of various structures provided inside the front fork easily and to simplify the leading out of the wires to the outside of the front fork and to simplify the manufacturing process of the front fork.

In the front fork 4 according to the embodiment, the piston 45 slides directly on the inner tube 30 and a cylinder on which the piston 45 slides is not present. That is, the first leg 4a of the front fork 4 has a so-called cylinderless structure. Thus, a space can be secured on the lower end side of the inner tube 30 since a cylinder is not present. Moreover, since this space is positioned on the lower end side of the first leg and is relatively large, the stroke sensor unit 76 can be secured easily.

In the above-described embodiment, although a configuration in which the conductor member 71 is inserted in the coil portion 74 has been described, the present invention is not limited to this. The coil portion 74 may be inserted in the conductor member 71 as long as the stroke amount of the first leg 4*a* can be detected based on a change occurring in inductance of the coil conductor 72. When the coil portion 74 is inserted in the conductor member 71, the conductor member 71 is has a cylindrical shape and the inner diameter of the conductor member 71 is larger than the outer diameter of the coil conductor 72 and the coil portion 74.

Moreover, in the above-described embodiment, although a configuration in which the conductor member 71 is attached to the piston 45 and the coil portion 74 is attached to the supporting member 28 has been described, the present invention is not limited to this. The coil portion 74 may be attached to the piston 45 and the conductor member 71 may be attached to the supporting member 28 as long as the stroke amount of the first leg 4*a* can be detected based on the change in inductance occurring in the coil conductor 72. When the coil portion 74 is attached to the piston 45 and the conductor member 71 is attached to the supporting member 28, the structures provided in the first leg 4*a* are disposed appropriately in an upside down manner.

In the above-described embodiment, although a configuration in which the members such as the partition wall member 35, the guide bush 49, and the cap 51 serving as the bearings of the inner tube 30 and the outer tube 31 are formed of an insulating material such as a resin has been described, the present invention is not limited to this. These members may be formed of metal of which the surface is processed with PTFE, for example, as long as the inner tube 30 and the outer tube 31 can be electrically isolated from each other.

In the above-described embodiment, although a configuration in which the detecting unit 80 calculates the stroke position and the stroke speed of the first leg 4*a* while referring to the table in which the relation between the sensor value and the stroke position of the first leg 4*a* is determined has been described, the present invention is not limited to this. For example, the detecting unit 80 may calculate the stroke position and the stroke speed of the first leg 4*a* from the detected sensor value with the aid of a program.

Moreover, in the above-described embodiment, the configuration of the damping force variable device 200 is not limited to the above-described configuration. For example, an optional damping force variable device can be used as long as the damping force variable device has a function of adjusting the damping force and can control the damping force by controlling the flow of the operating fluid.

While several embodiments of the present invention have been described, these embodiments have been presented by way of example only, and are not intended to limit the scope of the inventions. Indeed, the novel embodiments described herein may be embodied in a variety of other forms. Furthermore, various omissions, substitutions, and changes in the form of the embodiments described herein may be made without departing from the spirit of the inventions. The embodiments and modifications thereof would fall within the scope and spirit of the inventions and are included in the invention and its equivalent described in the scope of claims.

EXPLANATION OF REFERENCE NUMERALS

1: Two-wheeled motor vehicle
2: Vehicle body frame
3: Head pipe
4: Front fork
4*a*: First leg
5: Axle
6: Front wheel
7: Handle
8: Fuel tank
9: Engine
11: Seat
12: Swing arm
13: Rear wheel
14: Rear suspension
14*a*: First leg
15: Controller
26: Suspension spring
28: Supporting member
28*a*: Concave portion
28*b*: Ring groove
29: Wire
30: Inner tube
30*a*: Female screw
30*b*: Male screw
30*d*: Upper end surface
31: Outer tube
31*a*: Female screw
32: Axle-side unit
33: Vehicle body-side unit
34: Piston rod
34*a*: Male screw
35: Partition wall member
36: Ring
36*a*: Convex portion
37: Axle bracket
37*a*: Concave portion
37*b*: Axle attachment hole
37*c*: Female screw
37*d*: Seal groove
37*e*: Bottom portion
38: Seal
39: Guide portion
39*a*: Outer circumferential surface
39*b*: Ring groove
39*c*: Lower end surface
40: Cylinder portion
40*a*: Inwardly facing portion
40*b*: Male screw
41: Oil storage chamber
42: Operating oil chamber
43: Supply and discharge portion
43*a*: Third path
43*b*: Fourth path
43*c*: Check valve
43*d*: Throttle valve
44: Annular oil chamber
45: Piston
45*a*: Extension-side outlet check valve
45*b*: Compression-side inlet check valve
45*c*: Extension-side inlet check valve
45*d*: Compression-side outlet check valve
45*h*: Ring groove
45*i*: Concave portion
46: Connection hole
47: Plate spring
49: Guide bush
50: Seal
51: Cap
51*a*: Male screw
51*b*: Female screw 51c: Concave portion
52: Ring
61: Vehicle body-side attachment member
62: Axle-side attachment member
70: Stroke sensor
71: Conductor member
71b: Lower end
72: Coil conductor
73: Insulating member
74: Coil portion
74a: Convex portion
74b: Upper end
75a, 75b: Wire
76: Stroke sensor unit
80: Detecting unit
90: Solenoid
91, 92: Valve stopper
93: Valve seat member
93a: Rod portion
93b: Concave portion
93c: Hole
93d: Hole
93e: Valve seat
93f: Hole
94: Nut
95: Main valve member
95a: Hole
96: Main valve
96a: Hole
97: Pilot chamber
98: Plate spring
99: Passage
100, 101: Space
102: Distance collar
103: Gap
104: Case
105, 106: Core
107: Coil
108: Plunger
109: Operating rod
110, 111: Guide bush
112: Pilot valve
112a: Hole
113: Space
114: Spring
115: Space
116: Fail valve
117: Spring
118: Passage
119: Passage
120: Pilot passage
121, 122: Main passage
200: Damping force variable device
411: Oil storage portion
412: Air storage portion
421: Piston rod-side oil chamber
422: Piston-side oil chamber
451: Upper piston
451a, 451b: Hole
452: Lower piston
452a: Concave portion
452b: Hole
452c: Hole
801: Oscillation circuit
802: Timer unit
803: Arithmetic unit
L: Insertion length

What is claimed is:

1. A front fork having a damping variable leg, the damping variable leg comprising:
an outer tube provided at an upper end side of the front fork;
an inner tube provided at a lower end side of the front fork and inserted into an inner circumference side of the outer tube;
a piston rod, an upper end of which is attached to an upper end of the outer tube, the piston rod extending toward the lower end side along an axial direction of the outer tube;
a piston provided at a lower end of the piston rod; and
a damping force variable device provided at the piston so as to generate variable damping force by controlling a flow of an operating fluid enclosed in the damping variable leg, wherein
the damping variable leg further comprises:
a conductor member, an upper end of which is attached to the piston, the conductor member extending toward the lower end side along the axial direction; and
a coil conductor covered with an insulating member, a lower end of the coil conductor being attached to a lower end of the inner tube, the coil conductor extending toward the upper end side along the axial direction, the coil conductor being configured such that the conductor member can be inserted into the coil conductor, and
the damping variable leg detects a stroke amount of the damping variable leg based on a change in inductance of the coil conductor.

2. The front fork according to claim 1, wherein
the damping variable leg further comprises:
a detecting unit that detects the stroke amount of the damping variable leg based on the change in the inductance of the coil conductor.

3. The front fork according to claim 2, wherein
the detecting unit comprises:
an oscillation circuit electrically connected to the coil conductor so as to perform oscillation at a frequency corresponding to the change in the inductance of the coil conductor;
a timer unit that measures a waveform oscillated by the oscillation circuit and outputs a frequency value corresponding to the stroke amount of the damping variable leg resulting from extension and compression of the damping variable leg; and
an arithmetic unit that performs an arithmetic operation based on the frequency value output by the timer unit.

4. The front fork according to claim 3, wherein
the detecting unit is provided inside the insulating member.

5. The front fork according to claim 2, wherein
the detecting unit is provided inside the insulating member.

6. The front fork according to claim 1, wherein
the damping variable leg further comprises:
a first wire electrically connected to the coil conductor and extending to an outside of the inner tube from a lower end of the coil conductor.

7. The front fork according to claim 1, wherein
the damping variable leg further comprises:
an actuator provided at the piston; and
a second wire electrically connected to the actuator and extending through an inside of the piston rod to an outside of the outer tube.

8. The front fork according to claim 1, wherein
the damping variable leg further comprises:
a guide bush provided at an inner circumference on a lower end side of the outer tube;
a guide portion provided at an upper end of the inner tube on a side closer to the upper end side relative to the guide bush;
an annular oil chamber surrounded by the outer tube, the inner tube, the guide bush, and the guide portion;
a partition wall member having a portion provided at the inner tube;
an oil storage chamber partitioned by the partition wall member in the inner tube and formed on the upper end side relative to the partition wall member;
an operating oil chamber partitioned by the partition wall member in the inner tube and formed on the lower end side relative to the partition wall member;
a piston rod-side oil chamber partitioned by the piston in the operating oil chamber and formed on the upper end side relative to the piston;
a piston-side oil chamber partitioned by the piston in the operating oil chamber and formed on the lower end side relative to the piston;
a communication hole provided at the inner tube so as to allow the annular oil chamber and the piston rod-side oil chamber to be communicated with each other;
a check valve provided at the partition wall member to allow only a flow of oil from the oil storage chamber to the piston rod-side oil chamber; and
a throttle valve provided at the partition wall member so as to restrict the flow of oil between the oil storage chamber and the piston rod-side oil chamber,
the inner tube is slidably inserted into the inner circumference side of the outer tube via the guide bush and the guide portion,
the piston rod has a cross-sectional area in a diametrical direction smaller than a cross-sectional area in the diametrical direction of the annular oil chamber,
the piston rod has an upper end attached to the upper end of the outer tube,
the piston rod is slidably inserted through the partition wall member, and
the piston is slidably provided at an inner circumference side of the inner tube.

9. A front fork having a damping variable leg, the damping variable leg comprising:
an outer tube provided at an upper end side of the front fork;
an inner tube provided at a lower end side of the front fork and inserted into an inner circumference side of the outer tube;
a piston rod, an upper end of which is attached to an upper end of the outer tube, the piston rod extending toward the lower end side along an axial direction of the outer tube;
a piston provided at a lower end of the piston rod; and
a damping force variable device provided at the piston so as to generate variable damping force by controlling a flow of an operating fluid enclosed in the damping variable leg, wherein
the damping variable leg further comprises:
a coil conductor covered with an insulating member, an upper end of the coil conductor being attached to the piston, the coil conductor extending toward the lower end side along the axial direction; and
a conductor member, a lower end of which is attached to a lower end of the inner tube, the conductor member extending toward the upper end side along the axial direction, the conductor member being configured such that the conductor member can be inserted into the coil conductor, and
the damping variable leg detects a stroke amount of the damping variable leg based on a change in inductance of the coil conductor.

10. The front fork according to claim 9, wherein
the damping variable leg further comprises:
a detecting unit that detects the stroke amount of the damping variable leg based on the change in the inductance of the coil conductor.

11. The front fork according to claim 10, wherein
the detecting unit comprises:
an oscillation circuit electrically connected to the coil conductor so as to perform oscillation at a frequency corresponding to the change in the inductance of the coil conductor;
a timer unit that measures a waveform oscillated by the oscillation circuit and outputs a frequency value corresponding to the stroke amount of the damping variable leg resulting from extension and compression of the damping variable leg; and
an arithmetic unit that performs an arithmetic operation based on the frequency value output by the timer unit.

12. The front fork according to claim 11, wherein
the detecting unit is provided inside the insulating member.

13. The front fork according to claim 10, wherein
the detecting unit is provided inside the insulating member.

14. The front fork according to claim 9, wherein
the damping variable leg further comprises:
a first wire electrically connected to the coil conductor and extending to an outside of the inner tube from a lower end of the coil conductor.

15. The front fork according to claim 9, wherein
the damping variable leg further comprises:
an actuator provided at the piston; and
a second wire electrically connected to the actuator and extending through an inside of the piston rod to an outside of the outer tube.

16. The front fork according to claim 9, wherein
the damping variable leg further comprises:
a guide bush provided at an inner circumference on a lower end side of the outer tube;
a guide portion provided at an upper end of the inner tube on a side closer to the upper end side relative to the guide bush;
an annular oil chamber surrounded by the outer tube, the inner tube, the guide bush, and the guide portion;
a partition wall member having a portion provided at the inner tube;
an oil storage chamber partitioned by the partition wall member in the inner tube and formed on the upper end side relative to the partition wall member;
an operating oil chamber partitioned by the partition wall member in the inner tube and formed on the lower end side relative to the partition wall member;
a piston rod-side oil chamber partitioned by the piston in the operating oil chamber and formed on the upper end side relative to the piston;
a piston-side oil chamber partitioned by the piston in the operating oil chamber and formed on the lower end side relative to the piston;

a communication hole provided at the inner tube so as to allow the annular oil chamber and the piston rod-side oil chamber to be communicated with each other;

a check valve provided at the partition wall member to allow only a flow of oil from the oil storage chamber to the piston rod-side oil chamber; and a throttle valve provided at the partition wall member so as to restrict the flow of oil between the oil storage chamber and the piston rod-side oil chamber, the inner tube is slidably inserted into the inner circumference side of the outer tube via the guide bush and the guide portion, the piston rod has a cross-sectional area in a diametrical direction smaller than a cross-sectional area in the diametrical direction of the annular oil chamber, the piston rod has an upper end attached to the upper end of the outer tube, the piston rod is slidably inserted through the partition wall member, and the piston is slidably provided at an inner circumference side of the inner tube.

\* \* \* \* \*